(12) United States Patent
Yuchi et al.

(10) Patent No.: US 9,482,753 B2
(45) Date of Patent: Nov. 1, 2016

(54) SPLIT ROW-COLUMN ADDRESSING METHOD FOR THREE-DIMENSIONAL ULTRASOUND IMAGING

(71) Applicant: Huazhong University of Science and Technology, Wuhan (CN)

(72) Inventors: Ming Yuchi, Wuhan (CN); Mingyue Ding, Wuhan (CN); Yanping Jia, Wuhan (CN); Liushuai Lv, Beijing (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 163 days.

(21) Appl. No.: 14/285,370

(22) Filed: May 22, 2014

(65) Prior Publication Data
US 2015/0023135 A1   Jan. 22, 2015

(30) Foreign Application Priority Data

Jul. 22, 2013   (CN) .......................... 2013 1 0308456

(51) Int. Cl.
   *G01S 15/00*   (2006.01)
   *G01S 15/89*   (2006.01)
   *G10K 11/34*   (2006.01)

(52) U.S. Cl.
   CPC ........ *G01S 15/8925* (2013.01); *G01S 15/8927* (2013.01); *G01S 15/8993* (2013.01); *G10K 11/346* (2013.01)

(58) Field of Classification Search
   CPC ..................... G01S 15/8993; G01S 15/8927; G01S 15/8925; G10K 11/346
   See application file for complete search history.

(56) References Cited

U.S. PATENT DOCUMENTS

| | | | | |
|---|---|---|---|---|
| 2011/0125017 A1* | 5/2011 | Ramamurthy | ........... | A61B 8/08 600/443 |
| 2012/0179044 A1* | 7/2012 | Chiang | .................... | A61B 8/14 600/447 |
| 2012/0281502 A1* | 11/2012 | Tsushima | ............ | G01S 7/52077 367/87 |
| 2013/0128702 A1* | 5/2013 | Degertekin | ............. | G01S 15/89 367/140 |

OTHER PUBLICATIONS

Jensen, "Field: A Program for Simulating Ultrasound Systems." Medical & Biological Engineering & Computing, 34 (S1). pp. 351-353. 1996.

* cited by examiner

*Primary Examiner* — Luke Ratcliffe
*Assistant Examiner* — Hovhannes Baghdasaryan
(74) *Attorney, Agent, or Firm* — Davis Wright Tremaine LLP (57) ABSTRACT

The invention discloses a split row-column addressing method for three-dimensional ultrasound imaging, and the method comprises: for an N×N planar array, obtain the pulse-echo response distribution from fully connected two-dimensional planar array, parameters thereof comprising beam widths A' and B' at −6 dB and −20 dB respectively, average side lobe C', highest side lobe D' and main side-lobe energy ratio E'; set counter K=2, split two-dimensional planar array into K regions in channel direction, determine array elements amount and connect array elements in each region; calculate the time delay according to distance between the coordinates of each region and the focus point within a scanning range of the two-dimensional planar array, and analyze the two-dimensional planar array by ultrasonic sound field simulation algorithm according to the time delay of each region. The invention can solve the prior art of low resolution, and the problem that transmitted and received beam cannot be deflected.

4 Claims, 5 Drawing Sheets

SPLIT ROW-COLUMN ADDRESSING METHOD FOR THREE-DIMENSIONAL ULTRASOUND IMAGING

CROSS-REFERENCE TO RELATED APPLICATIONS

The present application is a U.S. non-provisional application which claims priority to Chinese Application No. 201310308456.X, filed on Jul. 22, 2013, which is herein incorporated by reference in its entirety.

FIELD OF THE INVENTION

The invention relates to a three-dimensional ultrasound imaging field, and more particularly to a split row-column addressing method for three-dimensional ultrasound imaging.

BACKGROUND OF THE INVENTION

Currently, two-dimensional transducer planar arrays and one-dimensional mechanical scanning linear arrays are crucial for three-dimensional ultrasound imaging. The two-dimensional transducer becomes a research hotspot since it can provide high-definition three-dimensional images in real time. The two-dimensional transducer planar array is composed of rectangular ultrasonic transducers distributed in lines and columns. Each ultrasonic transducer usually consists of two connection wires, one is a ground wire, and the other one is a channel wire used for adding electric signals to the transducer, and for simultaneously receiving electrical signals transformed from echo signals by the ultrasonic transducer. Normally, all the transducers share the same ground wire in the two-dimensional transducer planar array. To eliminate grating lobes, spacing between array elements of the ultrasonic transducer should be less than or equal to $\lambda/2$ ($\lambda$ is ultrasonic wavelength normally with an order of magnitude of $e^{-4}$ meters), and thus the maximum diameter of the wire is $\lambda/2$. Meanwhile, array elements of the two-dimensional transducer are numerous. Taking a 32×32 planar array for example, the number of both array elements and signal lines corresponding thereto is up to 1024 (the connection is referred to as 'fully connection'), such numerous and dense connection increases difficulty in producing the two-dimensional array.

Figure 2:
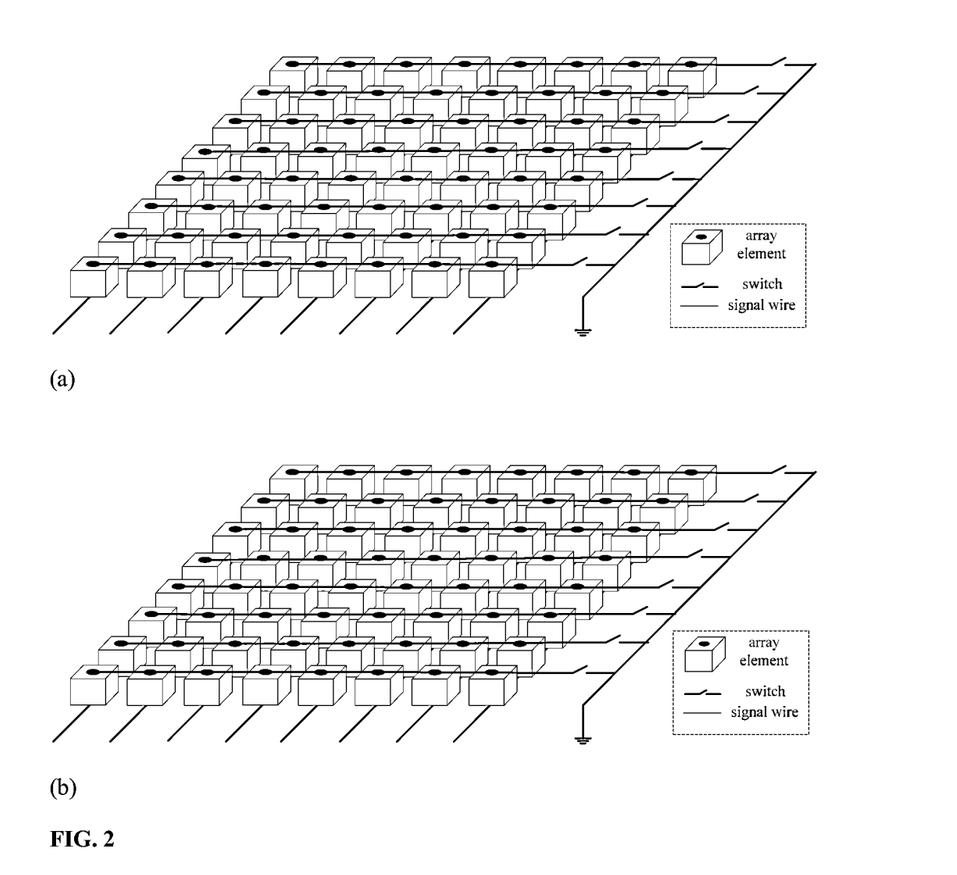
FIG. 2(a) is the front view of existing 8×8 two-dimensional row-column addressing connection mode.
FIG. 2(b) is a back view of existing 8×8 two-dimensional row-column addressing connection mode.

To simplify connection of the two-dimensional array, a research team led by Jesse Yen from the Department of Biomedical Engineering of the University of Southern California, USA proposed a wiring method based on row-column addressing. As shown in FIG. 2, the method connects all array elements in one row (or one column) of a two-dimensional transducer planar array via a wire, and the ground thereto via a switch, a linear direction of the switch being referred to as a grounding direction; array elements in each column (or each row) are connected via a wire, all elements sharing one channel and a linear direction of the channel being referred to as a channel direction. However, the wiring method has a disadvantage: all array element transducers sharing one channel and driven by one channel cannot facilitate delay focusing upon transmitting echo signals, and when receiving echo signals, all received echo signals are mixed altogether and cannot be processed via delay focusing thereafter, direct focusing cannot be facilitated in a grounding direction. Thus two problems are raised: firstly, resolution thereof decreases, and secondly, transmitted beams cannot be deflected in the channel direction.

SUMMARY OF THE INVENTION

In view of the above-mentioned problems, it is an objective of the invention to provide a split row-column addressing method for three-dimensional ultrasound imaging that is capable of addressing problems with the prior art comprising low resolution, and the transmitted and received beam cannot be deflected by splitting the array elements into multiple regions, enabling each region to share one wire and connected with one channel.

In accordance with an exemplary embodiment of the invention, provided is a split row-column addressing method for three-dimensional ultrasound imaging, comprising steps of:

(1) for an N×N planar array, obtaining pulse-echo response distribution from a fully connected two-dimensional planar array, parameters of the pulse-echo response distribution comprising beam widths A' and B' at −6 dB and −20 dB respectively, an average side lobe value C', a highest side lobe value D', and a main-side lobe energy ratio E'; setting a counter K=2 and splitting the two-dimensional planar array into K regions in a channel direction, each region being represented by a coordinate (n, m), where N is a positive integer greater than or equal to 2, n∈{1, 2, ... K}, and m∈{1, 2, ... N};

(2) determining the number of array elements in each of the K regions split in the channel direction, where, as K is odd, $$Z_1 = Z_K \in \left\{1, \ldots, \left\lceil \frac{N}{2} \right\rceil - \left\lfloor \frac{K}{2} \right\rfloor \right\}$$

$$Z_2 = Z_{K-1} \in \left\{1, \ldots, \left\lceil \frac{N}{2} \right\rceil - \left(\left\lfloor \frac{K}{2} \right\rfloor - 1\right) - Z_1 \right\}$$

$$\ldots$$

$$Z_{\lfloor \frac{K}{2} \rfloor} \in \left\{1, \ldots, 2\left(\left\lceil \frac{N}{2} \right\rceil - \left(Z_1 + Z_2 + \ldots + Z_{\lceil \frac{K}{2} \rceil}\right)\right)\right\}$$

As K is even, $$Z_1 = Z_K \in \left\{1, \ldots, \left\lceil \frac{N}{2} \right\rceil - \left(\frac{K}{2} - 1\right)\right\}$$

$$Z_2 = Z_{K-1} \in \left\{1, \ldots, \left\lceil \frac{N}{2} \right\rceil - \left(\frac{K}{2} - 2\right) - Z_1 \right\},$$

$$\ldots$$

$$Z_{\frac{K}{2}} = Z_{\frac{K}{2}+1} \in \left\{1, \ldots, \left\lceil \frac{N}{2} \right\rceil - \left(Z_1 + Z_2 + \ldots + Z_{\frac{K}{2}-1}\right)\right\};$$

(3) connecting all array elements in each region, namely connecting all array elements in each line by sharing one connection in a grounding direction, and connecting the ground therewith via a switch, and connecting all array elements belong to the same region in each column to a signal channel in the channel direction;

(4) calculating a time delay $\Delta t_{nm}$ required by each region according to a distance between an coordinate of the region and a focus point $(r_0, \theta_0, \phi_0)$ within the scanning range of the two-dimensional planar array, where $r_0$ is a distance between the focus point within the scanning range of the two-dimensional planar array and the center of the two-dimensional planar array, $\theta_0$ is an elevation of the focus point within the scanning range of the two-dimensional planar array, and $\phi_0$ is an azimuth of the focus point within the scanning range of the two-dimensional planar array;

(5) performing sound field analysis on the two-dimensional planar array using a ultrasonic sound field simulation algorithm according to the time delay $\Delta t_{nm}$ required by each region, whereby obtaining pulse-echo response distribution of the two-dimensional planar array, and parameters of the pulse-echo response distribution comprising beam widths A and B at −6 dB and −20 dB respectively, an average side lobe C, a highest side lobe value D, and a main side-lobe energy ratio E;

(6) setting k=k+1, repeating steps (2) to (5) until K=N; and (7) calculating Euclidean distances between the parameters of the pulse-echo response distribution in step (6) and those of the pulse-echo response distribution in step (1), and determining values of K and $Z_1, Z_2, \ldots, Z_K$ corresponding to the minimum Euclidean distance.

Advantageously, step (4) comprises:

(4-1) obtaining the coordinate $(x_{nm}, y_{nm}, z_{nm})$ of each region by using the center of the two-dimensional planar array as a coordinate origin;

(4-2) calculating the time delay $\Delta t_{nm}$ required by each region according to the distance between the coordinate $(x_{nm}, y_{nm}, z_{nm})$ of each region and the focus point $(r_0, \theta_0, \phi_0)$ within the scanning range of the two-dimensional planar array:

$$\Delta t_{nm} = \frac{r_0}{c} - \frac{\sqrt{(r_0 u_0 - x_{nm})^2 + (r_0 v_0 - y_{nm})^2 + (\cos\theta_0 r_0)^2}}{c}$$

where, $u_0 = \sin\theta_0 \cos\phi_0$, $v_0 = \sin\theta_0 \sin\phi_0$, $\theta_0$ is the elevation of the focus point, $\phi_0$ is the azimuth of the focus point, $(r_0 u_0, r_0 v_0)$ is a projection of the focus point under rectangular coordinates, c is a propagation velocity of ultrasound.

Advantageously, the ultrasonic sound field simulation algorithm comprises an entity-oriented experimental analysis method and a simulation-oriented experimental analysis method.

Advantageously, the Euclidean distance $$S = \sqrt{(A - A')^2 + (B - B')^2 + (C - C')^2 + (D - D')^2 + (E - E')^2}.$$

Advantages of the invention comprise:

1. As a result of steps (1) and step (2), the transmitted ultrasound beam can be focused on the channel direction, thereby improving the ultrasound image resolution in a channel direction and the quality of three-dimensional ultrasound image.

2. As a result of steps (1) and step (2), the transmitted ultrasound beam can be deflected through the time delay processing, thereby increasing the scanning scope of the two-dimensional planar array.

3. As a result of step (3), the front-end wiring amount can be reduced, and the original channel required can be reduced from N×N to (K+1)×N, thereby reducing the front-end processing complexity and the hardware implementation complexity of three-dimensional ultrasound system.

4. As a result of steps (6) and (7), a best split scheme of specific size array can be found, thus further improve the image quality of split row-column addressing method.

DESCRIPTION OF ACCOMPANYING DRAWINGS

FIG. 3(a) is a front view of 8×8 two-dimensional split row-column addressing connection mode split into 3 parts, each part containing 2, 4, 2 array elements respectively;

FIG. 3 (b) is a back view of 8×8 two-dimensional split row-column addressing connection mode split into 3 parts, each part containing 2, 4, 2 array elements respectively;

DETAILED DESCRIPTION OF THE INVENTION

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

Figure 1:
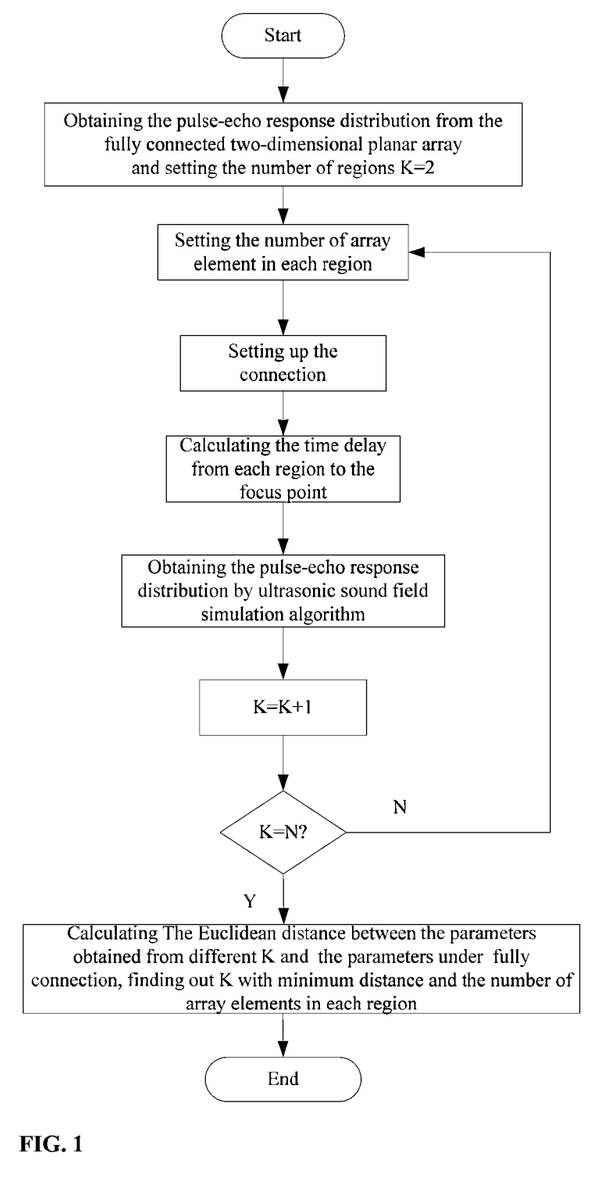
FIG. 1 is a flowchart of the proposed split row-column addressing connection mode of present invention.
Figure 3:
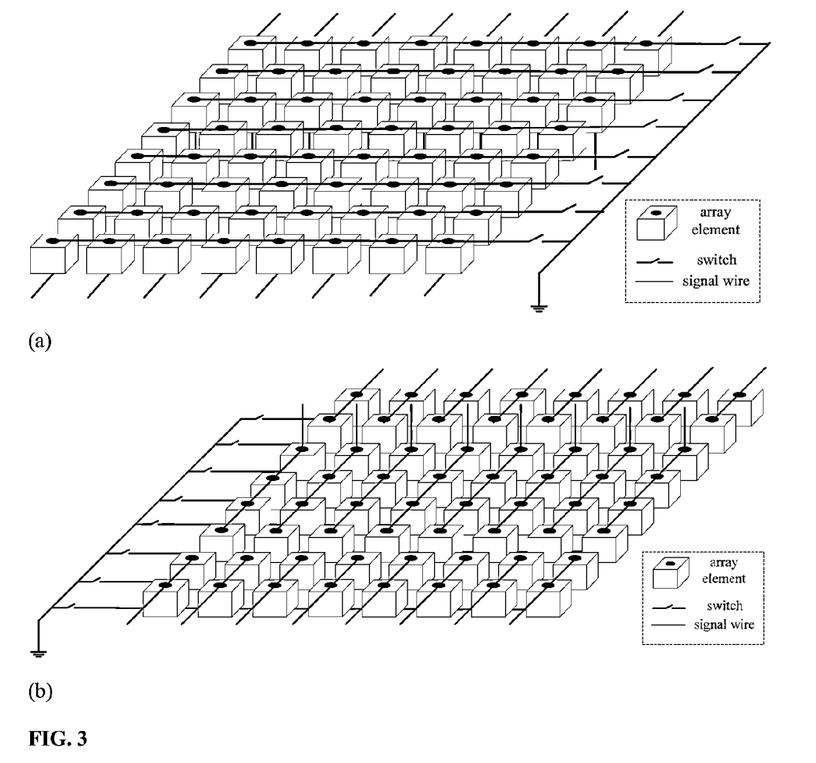

As shown in FIG. 1, the split row-column addressing method for three-dimensional ultrasound imaging comprises steps of:

for an N×N planar array, obtaining pulse-echo response distribution from a fully connected two-dimensional planar array, parameters of the pulse-echo response distribution comprising beam widths A' and B' at −6 dB and −20 dB respectively, an average side lobe value C' a highest side lobe value D', and main-side lobe energy ratio E'; setting a counter K=2 and splitting the two-dimensional planar array into K regions in a channel direction, each region being represented by a coordinate (n, m), where N is a positive integer greater than or equal to 2, n∈{1, 2, ... K}, and m∈{1, 2, ... N}; as shown in FIG. 3, the size of two-dimensional planar array is 8×8, and K=3;

(2) determining the number of array elements in each of the K regions split in the channel direction, where, as K is odd, $$Z_1 = Z_K \in \left\{1, \ldots, \left\lceil \frac{N}{2} \right\rceil - \left\lfloor \frac{K}{2} \right\rfloor\right\}$$

-continued $$Z_2 = Z_{K-1} \in \left\{1, \ldots, \left\lceil \frac{N}{2} \right\rceil - \left(\left\lfloor \frac{K}{2} \right\rfloor - 1\right) - Z_1\right\}$$

$$\ldots$$

$$Z_{\left\lfloor \frac{K}{2} \right\rfloor} \in \left\{1, \ldots, 2\left(\left\lceil \frac{N}{2} \right\rceil - \left(Z_1 + Z_2 + \ldots + Z_{\left\lfloor \frac{K}{2} \right\rfloor}\right)\right)\right\}$$

as K is even, $$Z_1 = Z_K \in \left\{1, \ldots, \left\lceil \frac{N}{2} \right\rceil - \left(\frac{K}{2} - 1\right)\right\}$$

$$Z_2 = Z_{K-1} \in \left\{1, \ldots, \left\lceil \frac{N}{2} \right\rceil - \left(\frac{K}{2} - 2\right) - Z_1\right\},$$

$$\ldots$$

$$Z_{\frac{K}{2}} = Z_{\frac{K}{2}+1} \in \left\{1, \ldots, \left\lceil \frac{N}{2} \right\rceil - \left(Z_1 + Z_2 + \ldots + Z_{\frac{K}{2}-1}\right)\right\};$$

(3) connecting all array elements in each region (as shown in FIG. 3), namely connecting all array elements in each line by sharing one connection in a grounding direction, and connecting the ground therewith via a switch, and connecting all array elements belong to the same region in each column to a signal channel in the channel direction;

(4) calculating a time delay $\Delta t_{nm}$ required by each region according to a distance between an coordinate of the region and a focus point $(r_0, \theta_0, \phi_0)$ within a scanning range of the two-dimensional planar array, where $r_0$ is a distance between the focus point within the scanning range of the two-dimensional planar array and the center of the two-dimensional planar array, and ranges from 0 to infinity, $\theta_0$ is an elevation of the focus point within the scanning range of the two-dimensional planar array, and ranges from 0 to 90 degrees, and $\phi_0$ is an azimuth of the focus point within the scanning range of the two-dimensional planar array, and ranges from 0 to 360 degrees. In details, step (4) comprises the following sub-steps;

(4-1) obtaining a coordinate $(x_{nm}, y_{nm}, z_{nm})$ of each region by using the center of the two-dimensional planar array as a coordinate origin; namely coordinates of the region is the coordinates of the center area array element;

(4-2) calculating the time delay $\Delta t_{nm}$ required by each region according to the distance between the coordinate $(x_{nm}, y_{nm}, z_{nm})$ of each region and the focus point $(r_0, \theta_0, \phi_0)$ within the scanning range of the two-dimensional planar array:

$$\Delta t_{nm} = \frac{r_0}{c} - \frac{\sqrt{(r_0 u_0 - x_{nm})^2 + (r_0 v_0 - y_{nm})^2 + (\cos\theta_0 r_0)^2}}{c}$$

where, $u_0 = \sin\theta_0 \cos\phi_0$, $v_0 = \sin\theta_0 \sin\phi_0$, $\theta_0$ is the elevation of the focus point $\phi_0$ is the azimuth of the focus point, $(r_0 u_0, r_0 v_0)$ is a projection of the focus point under rectangular coordinates, c is a propagation velocity of ultrasound.

(5) performing sound field analysis on the two-dimensional planar array using a ultrasonic sound field simulation algorithm according to the time delay $\Delta t_{nm}$ required by each region whereby obtaining pulse-echo response distribution of the two-dimensional planar array, parameters of the pulse-echo response distribution comprising beam widths A and B at −6 dB and −20 dB respectively, an average side lobe C, a highest side lobe value D, and a main side-lobe energy ratio E;

The ultrasonic sound field simulation algorithm comprises an entity-oriented experimental analysis method and a simulation-oriented experimental analysis method. Entities experimental analysis refers to using the real ultrasonic transducer to transmit ultrasonic beam and analyzing the echo image quality, this method is typically used to verify the late stage of the ultrasound system to determine the performance of the ultrasound system. Simulation analysis refers to the modeling method on ultrasonic transducers and ultrasonic propagation, and obtaining the ultrasonic echo signals by simulation (e.g., Jensen, J. A., Field: A program for simulating ultrasound systems, Med. Biol. Eng. Comput., 34, 351-354, 1996), and analyzing the pulse-echo response analysis, this method is commonly used in the early design phase of ultrasound systems, and to overall evaluate the pros and cons of the design through the analysis of image resolution, hardware complexity and imaging speed and so on.

(6) setting k=k+1, repeating steps (2) to (5) until K=N; and (7) calculating Euclidean distances between the parameters of the pulse-echo response distribution in step (6) and those of the pulse-echo response distribution in step (1), and determining values of K and $Z_1, Z_2, \ldots, Z_K$ corresponding to the minimum Euclidean distance, namely Euclidean distance $$S = \sqrt{(A - A')^2 + (B - B')^2 + (C - C')^2 + (D - D')^2 + (E - E')^2}$$

To further illustrate advantages of the present invention, the following examples are used to illustrate comparison results thereof and existing row-column addressing method, where size of a two-dimensional planar array is 48×48, and K=5, $Z_1=Z_2=Z_4=Z_5=6$, $Z_3=24$. If a region of $\sin^2\theta>0.02$ is considered as the side lobe region, a region of $\sin^2\theta<0.02$ is considered as the main lobe region, a beam width at −6 db and −20 db respectively, an average side lobe value (ASLL), a highest side lobe value (PSLL), and a main-side lobe energy ratio (MSR) of the pulse-echo response in the channel direction and the grounding direction are measured, and measured results are shown in Table 1:

TABLE 1

Comparison between the present invention and traditional addressing methods

| Connection Mode | Channel Direction | | Grounding Direction | | MSR | ASLL | PSLL |
| --- | --- | --- | --- | --- | --- | --- | --- |
| | −6 dB/mm | −20 dB/mm | −6 dB/mm | −20 dB/mm | | | |
| Row-Column addressing | 2.1988 | 6.2144 | 1.5707 | 3.2036 | 43.793 | −93.684 | −40.21 |
| Split Row-Column addressing | 1.5707 | 2.9524 | 1.4451 | 2.9524 | 46.8887 | −98.812 | −47.121 |

As shown in Table 1, compared with traditional row-column addressing method, a main lobe width of the invention decreases obviously in the channel direction, which means the connection mode can improve the resolution of three-dimensional image in a channel direction, and other indicators of the invention are better than the row-column addressing method, and therefore the invention can improve overall image quality of three-dimensional ultrasound images.

Figure 4:
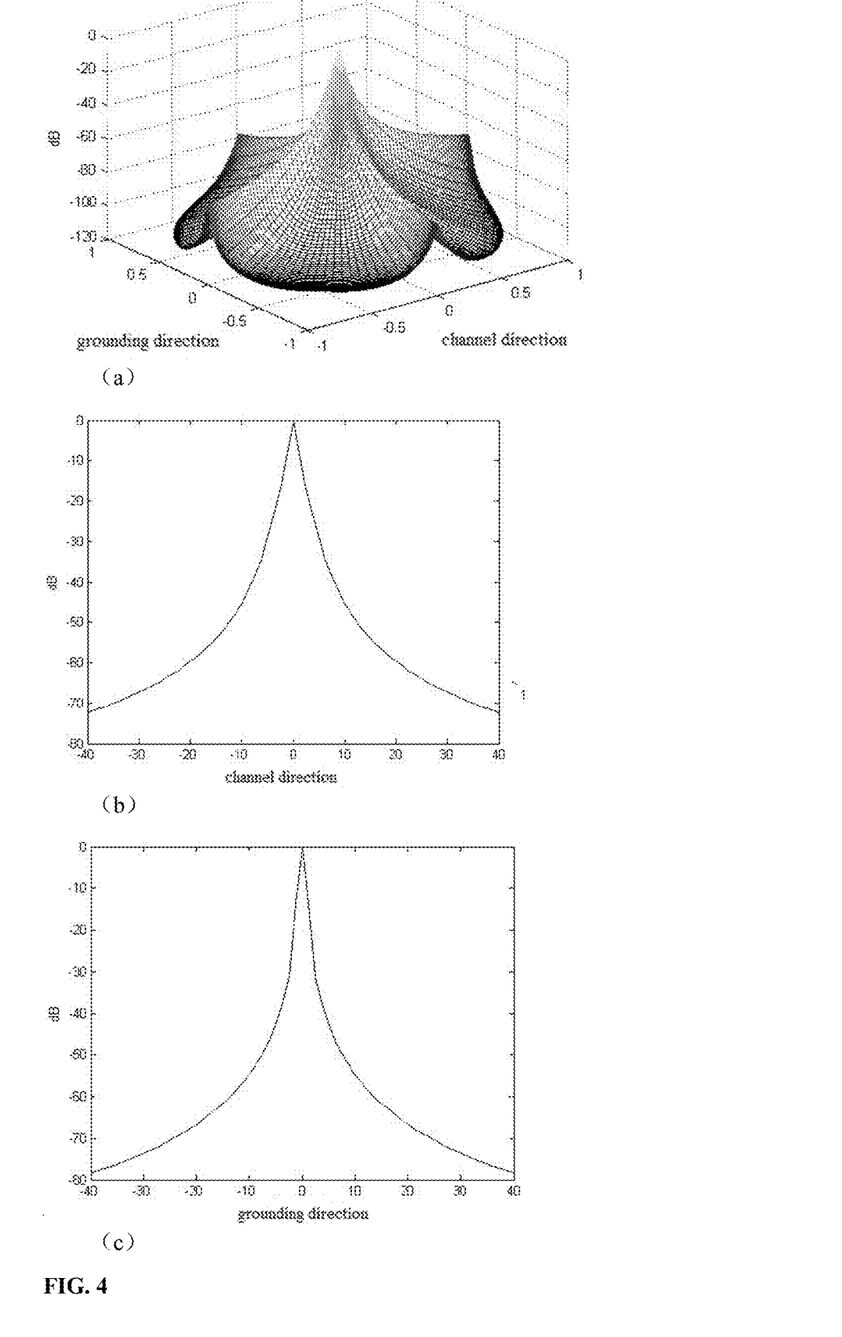
FIG. 4(a) illustrates pulse-echo response distribution of 48×48 two-dimensional split row-column addressing connection mode.
FIG. 4(b) illustrates pulse-echo response distribution of 48×48 two-dimensional split row-column addressing connection mode in a channel direction.
FIG. 4(c) illustrates pulse-echo response distribution of 48×48 two-dimensional split row-column addressing connection mode in the grounding direction.

As shown in FIG. 4, the main lobe width of pulse-echo response distribution obtained via traditional addressing methods is very wide at −6 dB and −20 dB in the channel direction, and thus reducing three-dimensional imaging resolution thereof.

Figure 5:
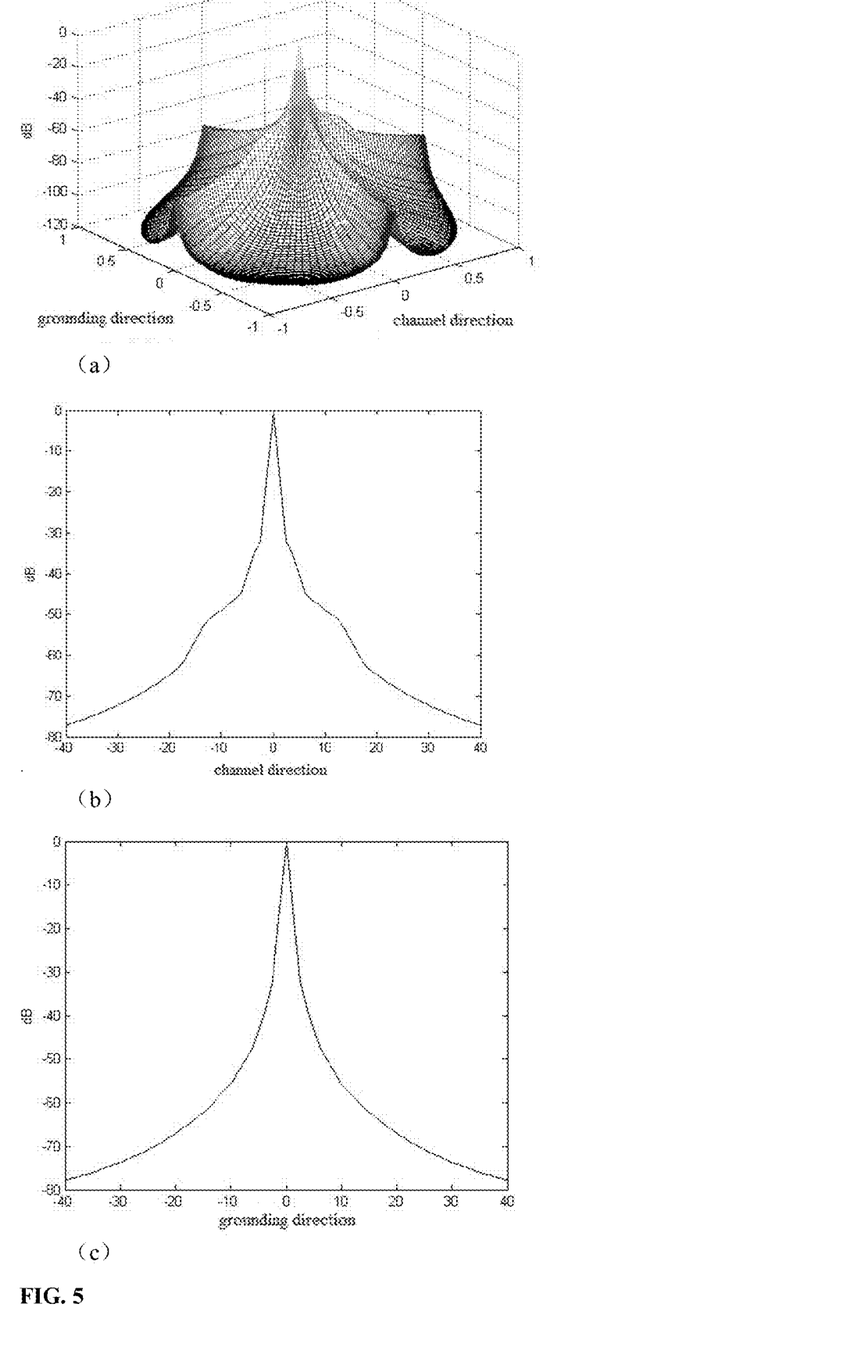
FIG. 5(a) illustrates pulse-echo response distribution of 48×48 two-dimensional split row-column addressing connection mode.
FIG. 5(b) illustrates pulse-echo response distribution of 48×48 two-dimensional split row-column addressing connection mode in a channel direction.
FIG. 5(c) illustrates pulse-echo response distribution of 48×48 two-dimensional split row-column addressing connection mode in the grounding direction.

As shown in FIG. 5, a width of a main lobe of the pulse-echo response distribution at −6 db and −20 db respectively in the channel direction decrease significantly, the side lobe level also decreases significantly, and MSR increases. Therefore, compared with the conventional addressing method, the invention can obviously improve quality of the three-dimensional ultrasound image.

While the invention has been described in its presently preferred embodiment, it is understood that the words which have been used are words of description rather than words of limitation, and that changes within the purview of the appended claims may be made without departing from the scope and spirit of the invention in its broader aspects. All variations and modifications that come within the spirit of the invention are desired to be protected.

What is claimed is:

1. A split row-column addressing method for three-dimensional ultrasound imaging, comprising steps of:

(1) for an N×N planar array, obtaining pulse-echo response distribution from a fully connected two-dimensional planar array, parameters of the pulse-echo response distribution comprising beam widths A' and B' at −6 dB and −20 dB respectively, an average side lobe value C', a highest side lobe value D', and a main-side lobe energy ratio E', setting a counter K=2, and splitting the two-dimensional planar array into K regions in a channel direction, each region being represented by a coordinate (n, m), wherein N is a positive integer greater than or equal to 2, n∈{1, 2, . . . , K}, and m∈{1, 2, . . . , N};

(2) determining the number of array elements $Z_1$, $Z_2$, ... $Z_K$ in each of the K regions split in the channel direction, wherein, when K is odd, $$Z_1 = Z_K \in \left\{1, \ldots, \left\lceil \frac{N}{2} \right\rceil - \left\lfloor \frac{K}{2} \right\rfloor \right\},$$

$$Z_2 = Z_{K-1} \in \left\{1, \ldots, \left\lceil \frac{N}{2} \right\rceil - \left(\left\lfloor \frac{K}{2} \right\rfloor - 1\right) - Z_1 \right\},$$

..., $$Z_{\lfloor \frac{K}{2} \rfloor} \in \left\{1, \ldots, 2\left(\left\lceil \frac{N}{2} \right\rceil - \left(Z_1 + Z_2 + \ldots + Z_{\lfloor \frac{K}{2} \rfloor}\right)\right)\right\},$$

when K is even, $$Z_1 = Z_K \in \left\{1, \ldots, \left\lceil \frac{N}{2} \right\rceil - \left(\frac{K}{2} - 1\right)\right\},$$

$$Z_2 = Z_{K-1} \in \left\{1, \ldots, \left\lceil \frac{N}{2} \right\rceil - \left(\frac{K}{2} - 2\right) - Z_1 \right\},$$

..., $$Z_{\frac{K}{2}} = Z_{\frac{K}{2}+1} \in \left\{1, \ldots, \left\lceil \frac{N}{2} \right\rceil - \left(Z_1 + Z_2 + \ldots + Z_{\frac{K}{2}-1}\right)\right\};$$

(3) connecting all array elements in each region, by connecting all array elements in each line by sharing one connection in a grounding direction, and connecting with the ground via a switch, and connecting all array elements belonging to the same region in each column to a signal channel in the channel direction;

(4) calculating a time delay $\Delta t_{nm}$ required by each region according to a distance between a coordinate of the region and a focus point $(r_0, \theta_0, \phi_0)$ within a scanning range of the two-dimensional planar array, wherein $r_0$ is a distance between the focus point within the scanning range of the two-dimensional planar array and the center of the two-dimensional planar array, $\theta_0$ is an elevation of the focus point within the scanning range of the two-dimensional planar array, and $\phi_0$ is an azimuth of the focus point within the scanning range of the two-dimensional planar array;

(5) performing the sound field analysis on the two-dimensional planar array using a ultrasonic sound field simulation algorithm according to the time delay $\Delta t_{nm}$ required by each region thereby obtaining pulse-echo response distribution of the two-dimensional planar array, and the parameters of the pulse-echo response distribution comprising beam widths A and B at −6 dB and −20 dB respectively, an average side lobe C, a highest side lobe value D, and a main side-lobe energy ratio E;

(6) setting k=k+1, repeating steps (2) to (5) until K=N; and (7) . . . calculating Euclidean distances between the parameters of the pulse-echo response distribution in step (6) and the parameters of the pulse-echo response distribution in step (1), and determining values of K and $Z_1$, $Z_2$, . . . , $Z_K$ corresponding to the minimum Euclidean distance.

2. The split row-column addressing method of claim 1, wherein step (4) comprises:

(4-1) obtaining the coordinate $(x_{nm}, y_{nm}, z_{nm})$ of each region by using the center of the two-dimensional planar array as a coordinate origin;

taking the center of the two-dimensional planar array as the origin coordinate, and obtaining the coordinate $(x_{nm}, y_{nm}, z_{nm})$ of each region;

(4-2) calculating the time delay $\Delta t_{nm}$ required by each region according to the distance between the coordinate $(x_{nm}, y_{nm}, z_{nm})$ of each region and the focus point $(r_0, \theta_0, \phi_0)$ within the scanning range of the two-dimensional planar array:

$$\Delta t_{nm} = \frac{r_0}{c} - \frac{\sqrt{(r_0 u_0 - x_{nm})^2 + (r_0 v_0 - y_{nm})^2 + (\cos\theta_0 r_0)^2}}{c}$$

wherein, $u_0 = \sin\theta_0 \cos\phi_0$, $v_0 = \sin\theta_0 \sin\phi_0$, $\theta_0$ is the elevation of the focus point, $\phi_0$ is the azimuth of the focus point, $(r_0 u_0, r_0 v_0)$ is a projection of the focus point under rectangular coordinates, and c is a propagation velocity of ultrasound.

3. The split row-column addressing method of claim 1, wherein the ultrasonic sound field simulation algorithm comprises an entity-oriented experimental analysis method and a simulation-oriented experimental analysis method.

4. The split row-column addressing method of claim 1, wherein the Euclidean distance $$S = \sqrt{(A-A')^2 + (B-B')^2 + (C-C')^2 + (D-D')^2 + (E-E')^2}.$$

\* \* \* \* \*